United States Patent [19]

Sinnhuber et al.

[11] Patent Number: 5,490,691
[45] Date of Patent: Feb. 13, 1996

[54] VEHICLE SAFETY ARRANGEMENT FOR POSITIONING A VEHICLE OCCUPANT

[75] Inventors: Ruprecht Sinnhuber, Gifhorn; Bernd Richter, Bokensdorf, both of Germany

[73] Assignee: Volkswagen AG, Wolfsburg, Germany

[21] Appl. No.: 247,262

[22] Filed: May 23, 1994

Related U.S. Application Data

[63] Continuation-in-part of Ser. No. 42,823, Apr. 5, 1993, abandoned.

[30] Foreign Application Priority Data

Jun. 30, 1992 [DE] Germany .................... 42 21 414.9

[51] Int. Cl.⁶ .................. B60R 21/22; B60R 21/28; B60R 21/32
[52] U.S. Cl. .................. 280/735; 280/730.2; 280/739; 280/753; 180/274
[58] Field of Search .................. 280/730 A, 730 R, 280/735, 734, 753, 736, 737, 739, 728 R, 732, 730.2, 730.1, 728.1; 180/274

[56] References Cited

U.S. PATENT DOCUMENTS

| | | | |
|---|---|---|---|
| 3,741,584 | 6/1973 | Arai | 280/735 |
| 3,744,815 | 7/1973 | Scherenberg | 280/735 |
| 3,861,710 | 1/1975 | Okubo | 280/735 |
| 4,198,075 | 4/1980 | Kob et al. | 280/753 |
| 4,258,931 | 3/1981 | Lee et al. | 280/739 |
| 4,948,168 | 8/1990 | Adomeit et al. | 280/730 R |
| 4,951,963 | 8/1990 | Behr et al. | 280/753 |
| 5,344,184 | 9/1994 | Keeler et al. | 280/730 R |
| 5,398,185 | 3/1995 | Omura | 280/735 |

FOREIGN PATENT DOCUMENTS

| | | | |
|---|---|---|---|
| 3809074 | 10/1989 | Germany . | |
| 4023109 | 1/1992 | Germany . | |
| 4019677 | 1/1992 | Germany . | |
| 3246137 | 11/1991 | Japan | 280/728 R |
| 3276844 | 12/1991 | Japan | 280/730 A |
| 4197847 | 7/1992 | Japan | 280/753 |
| 4358946 | 12/1992 | Japan | 280/735 |
| 6032195 | 2/1994 | Japan | 280/735 |

Primary Examiner—Margaret A. Focarino
Assistant Examiner—Peter C. English
Attorney, Agent, or Firm—Brumbaugh, Graves, Donohue & Raymond

[57] ABSTRACT

To protect a vehicle occupant from injury by a safety airbag activated in the event of a collision when the occupant's actual position is different from a normal occupant restraint position, an occupant-moving arrangement is provided to move the occupant into the normal restraint position prior to full activation of an airbag. The occupant-moving arrangement is effected by inflation of the airbag with an initially limited pressure or by a movable cushion or a pivoted flap driven by a gas generator.

6 Claims, 3 Drawing Sheets

VEHICLE SAFETY ARRANGEMENT FOR POSITIONING A VEHICLE OCCUPANT

REFERENCE TO RELATED APPLICATION

This application is a continuation-in-part of our application Ser. No. 08/042,823, filed Apr. 5, 1993, abandoned.

BACKGROUND OF THE INVENTION

This invention relates to vehicle safety arrangements for protecting occupants of vehicles in the event of a collision.

Conventional vehicle airbags are activated in response to signals produced by a collision detector at the start of a collision. For example, an acceleration or deceleration sensor may be used, or a contact sensor may be provided on the outside of the vehicle containing several contact bars which are normally spaced at a defined distance from each other but are moved into contact with each other upon collision-initiated deformation.

One difficulty encountered in conventional airbag arrangements results from their being designed to protect a vehicle occupant positioned in a predetermined location in the vehicle such as the center of the vehicle seat. At the moment of a collision and the resulting activation of the airbag, however, the occupant may in fact be located in a different position. In the case of an airbag positioned at one side of the occupant and especially serving for lateral protection of the head and chest region of the occupant, the desired protection may not be provided if the occupant's head and chest region are not located in the normal position, i.e., the center of the corresponding vehicle seat, at the time of the collision, but the occupant's head instead is located, for example, close to the lateral airbag. Then, if this airbag is fully activated immediately in a collision, undesirable force may be applied to the occupant by the airbag because of the very small initial distance between the airbag and the occupant.

For this reason, the airbag systems disclosed, for example, in German Patent No. 38 09 074 and German Offenlegungsschrift No. 40 19 677, are at first inflated relatively weakly so that the impact of the bag on a vehicle occupant sitting "out of position" will not be excessive and the airbags are then fully activated. But, in these arrangements, there is a danger that some of the deceleration distance for the vehicle occupant may be lost.

German Offenlegungsschrift No. 40 23 109 discloses an occupant protection system for vehicles in which the sitting position of the occupant in relation to the associated occupant protection device is continuously monitored and the system then controls the timing and extent of the protective measures to be instituted in a collision. Apart from the relatively great cost ultimately required by this system for each vehicle occupant or for each seat in the vehicle, this protection arrangement operates according to the particular "out of position" status of the occupant rather than being designed for the normal occupant position.

SUMMARY OF THE INVENTION

Accordingly, it is an object of the present invention to provide a vehicle safety arrangement for vehicle occupants which overcomes the disadvantages of the prior art.

Another object of the invention is to provide a vehicle safety arrangement airbag which, with minimal additional cost, provides the same inflation condition at the instant of full activation of the airbag regardless of the initial position of the vehicle occupant.

These and other objects of the invention are attained by providing a vehicle safety arrangement designed to move a vehicle occupant into a designated restraint position prior to full activation of an airbag arrangement.

Whereas in the prior art, "out of position" situations are accepted as a given and the full activation of the airbag is merely delayed, the present invention is designed to move an "out of position" occupant into the normal predetermined restraint position. Accordingly, at the instant of full activation of the airbag, the same condition is always present with respect to the relative location of vehicle occupant and airbag.

The occupant-positioning arrangement provided for this purpose may utilize an airbag which may be the very same airbag constituting the safety device itself. The inflation of this airbag, which is initiated by a pre-collision sensor, occurs at a pressure which is selected to be high enough to ensure that the vehicle occupant will be moved into the normal restraint position but not so high as to perform the actual protective function. It will be understood that this requires the occupant-positioning airbag to have an appropriate shape so that it is able to move the vehicle occupant (or a theoretical average vehicle occupant) into the normal position.

It should be noted at this point that the occupant-positioning device need not necessarily constitute an airbag. Instead, flaps or cushions arranged to be displaceable or rotatable at the start of a collision may be used for this purpose.

It is also possible to employ a separate pressure reservoir, preferably connectable under valve control to a compressor carried on the vehicle, for recharging for operation of the occupant-positioning device. Moreover, especially if the actual safety airbag has not been fully released, the positioning airbag may be restored to its original position ("regenerated") by connecting it to a source of vacuum aboard the vehicle which can be provided by the vehicle engine.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
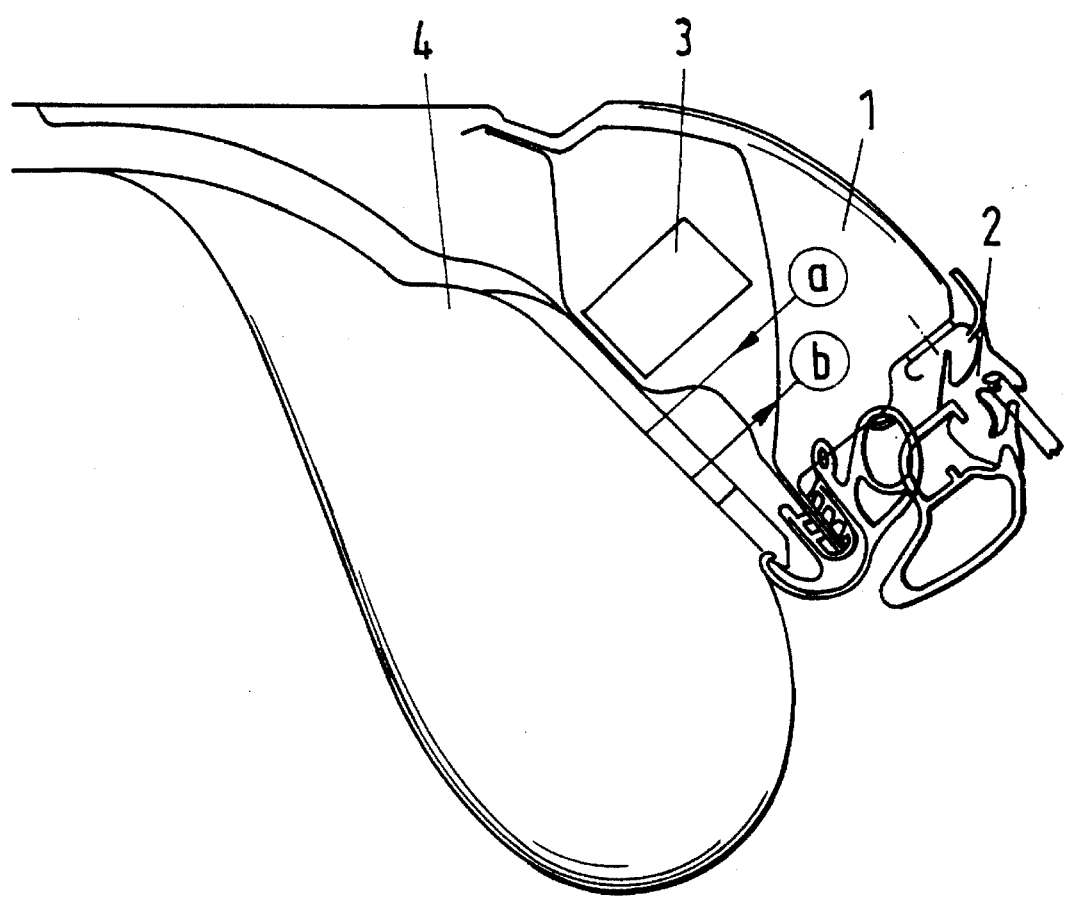
FIG. 1 is a fragmentary cross-sectional view of the roof column portion of a vehicle containing an occupant-positioning airbag providing lateral protection of the head of a seated occupant arranged according to the invention.

Referring first to the typical embodiment shown in FIG. 1, a vehicle roof column 1 is provided with door seals 2 in the conventional manner, not requiring further description. In the roof column 1, a gas generator 3 is mounted to supply gas upon activation to inflate a lateral airbag 4, which is shown in its inflated condition. Since the gas generator 3 and the airbag 4 are conventional and thoroughly familiar to those skilled in the art, they are not described in further detail. The gas generator 3 inflates the airbag 4 by a rapid supply of gas when a sensor delivers an electrical signal, indicating a collision, to a triggering device in a conventional manner.

Figure 2:
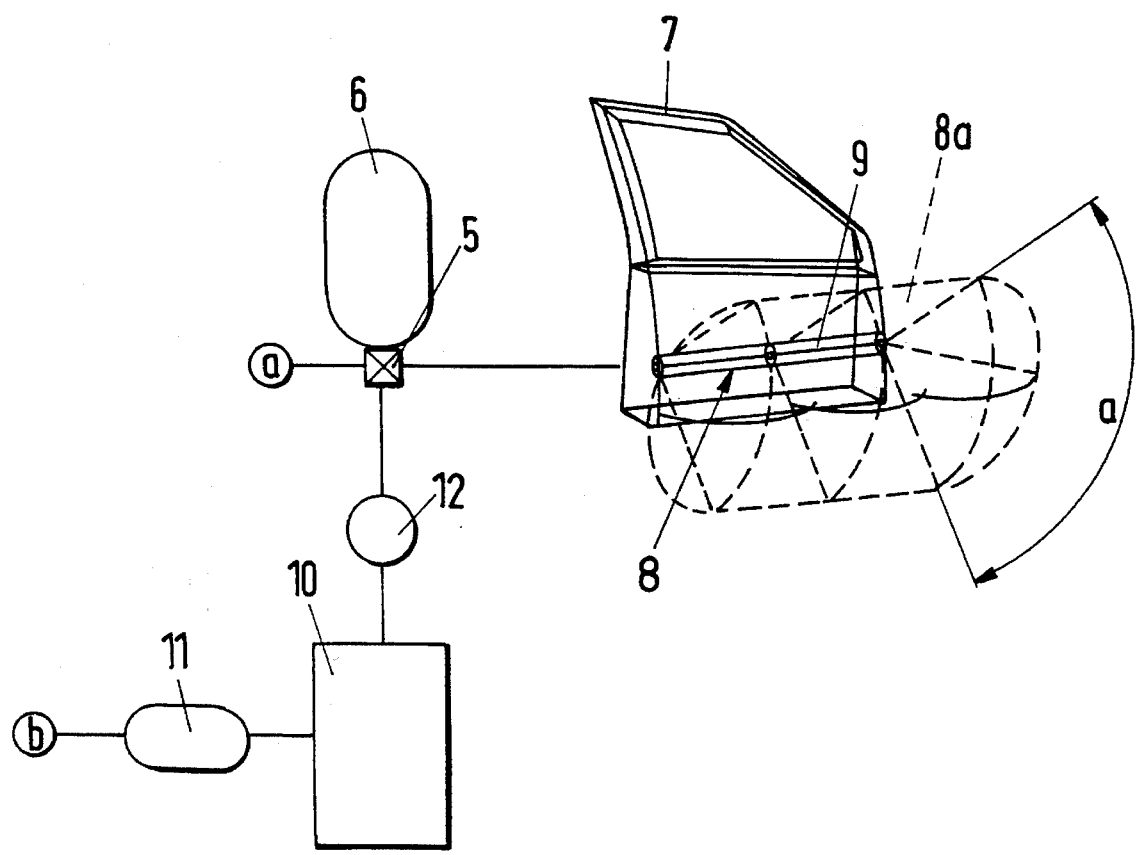
FIG. 2 is a schematic diagram illustrating electrical and pneumatic components associated with the arrangement shown in FIG. 1.

In the embodiment of the invention described by way of example, the airbag 4 is used not only as an essential constituent of the safety device itself, but also as a device for moving the vehicle occupant away from its actual position at the moment of commencement of the collision into a normal restraint position. For this purpose, an inlet a for the pressure medium, shown in FIG. 2, is connectable by way of a valve 5 to a pressure reservoir 6 as soon as a precollision sensor 8 provides a signal indicating an imminent collision. In the illustrated embodiment, the pre-collision sensor 8, which is of conventional design, is arranged in a side door 7 of the vehicle and operates without contact, e.g., using microwave techniques. The pre-collision sensor has a relatively wide scanning field 8a, extending over an angle α (shown as 90°) in the vertical plane. A sensor bar 9, integral with the pre-collision sensor 8 and consisting, for example, of several contact bars normally separated by an electrically insulating air space, thereafter initiates full activation of the airbag 4 when the collision occurs.

Consequently, as soon as the pre-collision sensor 8 has detected an impending lateral collision, discharge of the pressure reservoir 6 by way of the connection a effects initial inflation of the airbag 4 at a speed and with a pressure effecting a tolerable movement of the occupant of an adjacent seat out of an "out of position" condition approximately into the normal restraint position for which the airbag 4 is optimized.

If this positioning arrangement should happen to misfire, it is possible to utilize negative pressure generated by the vehicle engine 10 and stored in a vacuum reservoir 11 and applied through a connection b to restore the airbag 4 to its initial condition in which it is disposed largely within the contour of the roof column 1. It is also possible to refill the pressure reservoir 6, which may have been filled by a gas-generating cartridge, through the valve 5 from a compressor 12 driven by the vehicle engine 10 and the valve 5.

It will be understood that the invention is not limited to a lateral airbag in the vicinity of the head of the occupant of an adjacent seat. If the airbag is installed at another location, it may also be necessary to accommodate the associated pre-collision sensor in a different location, for example, in a shock absorber. Furthermore, a pre-collision sensor may be dispensed with if the configuration of the collision sensor is suitably graduated.

Figure 1A:
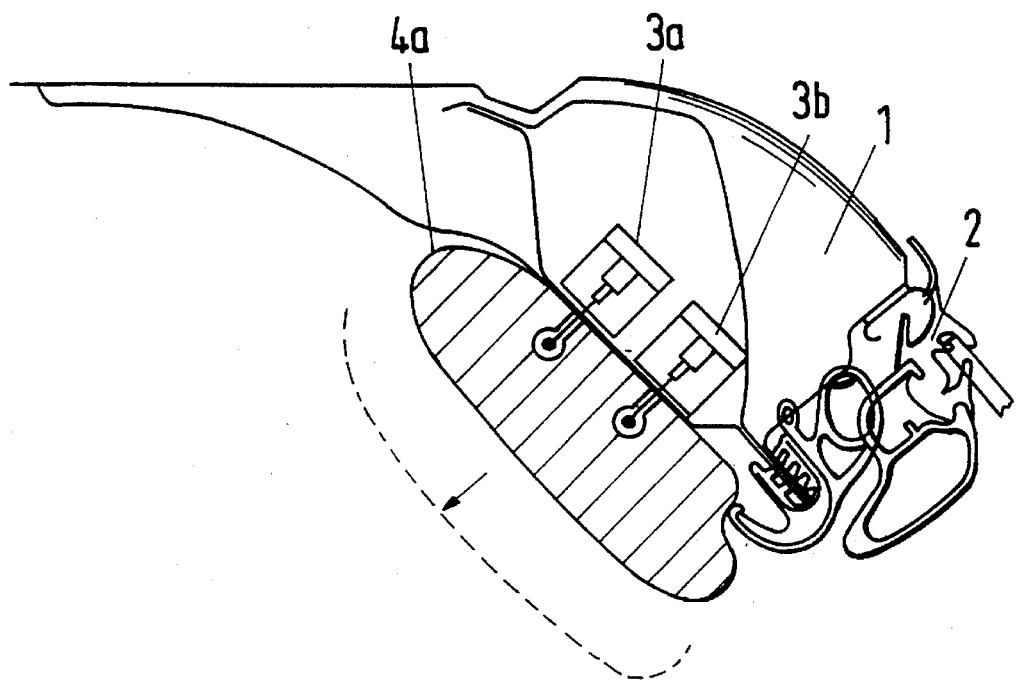
FIG. 1a is a fragmentary cross-sectional view similar to FIG. 1 showing a modified form of the invention in which an occupant-positioning pad is movable by gas-generating elements.

In the modified form of the invention shown in FIG. 1a, the vehicle roof column 1, having conventional door seals 2 and the gas generator 3 and airbag 4, also contains two other gas generators 3a and 3b having pistons connected to a movable pad or cushion 4a. In response to detection of an impending collision by the precollision sensor, the gas generators 3a and 3b are activated to drive the pad 4a in the direction indicated by the arrow to the dotted-line position shown in FIG. 1a so as to move the head and upper body portion of an occupant in an adjacent seat into the normal occupant restraint position prior to deployment of the airbag 4, as described above in connection with FIG. 1.

Figure 1B:
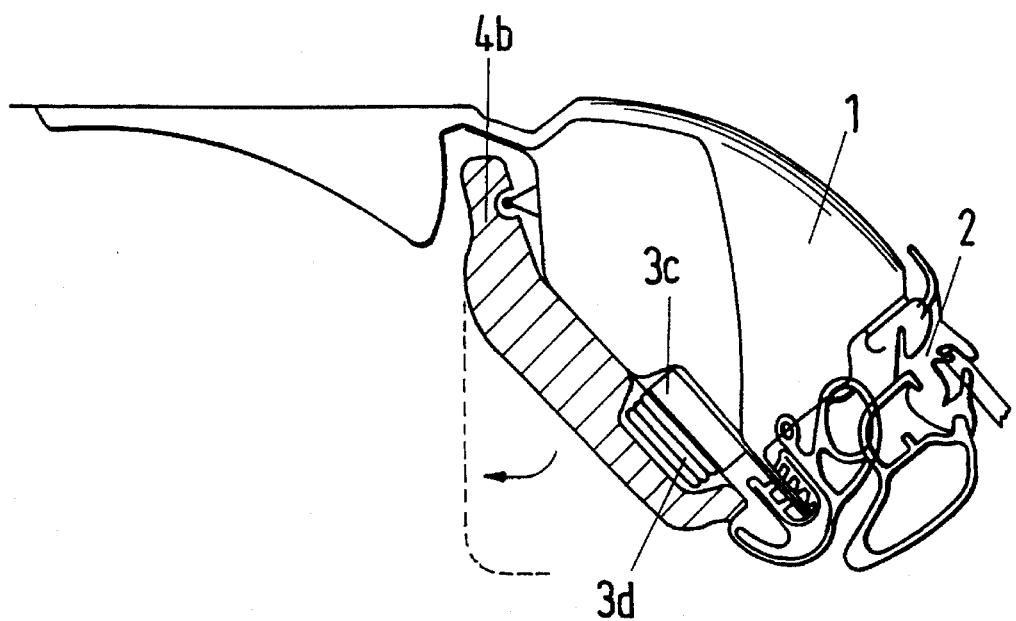
FIG. 1b is a fragmentary cross-sectional view similar to FIG. 1 showing another modified form of the invention in which an occupant-positioning pivoting flap is moved by an inflatable airbag.

In the further embodiment shown in FIG. 1b, a vehicle roof column 1, having conventional seals 2, the gas generator 3 and the airbag 4, also has another gas generator 3c coupled to a mini-airbag 3d received in a recess in a padded flap 4b, which is pivotably supported in a recess in the roof column. Upon detection of an impending collision by the precollision sensor, the gas generator 3c is activated, inflating the mini-airbag 3d so as to pivot the padded flap 4b in the direction indicated by the arrow to the dotted-line position shown in FIG. 1b, moving the head and upper body portion of an occupant of an adjacent seat into the normal occupant restraint position prior to deployment of the airbag 4.

The invention provides a safety device which ensures that, in a collision, the vehicle occupant will first be moved into a normal restraint position before the protective airbag is fully activated.

Although the invention has been described herein with reference to specific embodiments, many modifications and variations therein will readily occur to those skilled in the art. Accordingly, all such variations and modifications are included within the intended scope of the invention.

We claim:

1. A vehicle safety arrangement for protecting an occupant comprising airbag means arranged to be activated in the event of a collision and connected to a collision sensor arranged to cause full activation of the airbag means, a precollision sensor for detecting an impending collision, and occupant-moving means separate from the airbag means and activatable in response to the precollision sensor prior to full activation of the airbag means for moving the occupant of a vehicle seat into a normal restraint position.

2. A vehicle safety arrangement according to claim 1 wherein the occupant-moving means comprises a flap and means for moving the flap in the direction of the normal occupant restraint position.

3. A vehicle safety arrangement according to claim 1 wherein the occupant-moving means comprises a cushion and means for moving the cushion in the direction of the normal occupant restraint position.

4. A vehicle safety arrangement according to claim 1 including a pressure reservoir connectable to the airbag means to supply gas thereto to activate the airbag means.

5. A vehicle safety arrangement according to claim 1 including a negative pressure source connectable to the airbag means for restoring the airbag means to its original condition after inflation.

6. A vehicle safety arrangement according to claim 1 wherein the precollision sensor is an integral part of the collision sensor.

* * * * *